United States Patent
Yoo et al.

(10) Patent No.: US 11,264,936 B2
(45) Date of Patent: Mar. 1, 2022

(54) METHOD AND APPARATUS FOR CONTROLLING OPERATION OF A PERMANENT MAGNET ROTARY ELECTRIC MACHINE

(71) Applicant: GM GLOBAL TECHNOLOGY OPERATIONS LLC, Detroit, MI (US)

(72) Inventors: Anno Yoo, Rochester, MI (US); Daniel J. Berry, Macomb Township, MI (US); Young J. Kim, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 16/589,594

(22) Filed: Oct. 1, 2019

(65) Prior Publication Data
US 2021/0099123 A1    Apr. 1, 2021

(51) Int. Cl.
*H02P 29/66* (2016.01)
*H02P 27/06* (2006.01)

(52) U.S. Cl.
CPC .............. *H02P 29/66* (2016.02); *H02P 27/06* (2013.01)

(58) Field of Classification Search
CPC ....................................................... H02P 29/66
See application file for complete search history.

(56) References Cited

U.S. PATENT DOCUMENTS

| | | | |
|---|---|---|---|
| 4,926,105 A * | 5/1990 | Mischenko | H02P 21/06 318/800 |
| 8,482,237 B2 | 7/2013 | Berry et al. | |
| 8,565,954 B2 | 10/2013 | Yeh et al. | |
| 8,762,116 B2 | 6/2014 | Yeh et al. | |
| 9,356,551 B2 | 5/2016 | Berry et al. | |
| 2016/0352275 A1 * | 12/2016 | Senoo | H02P 29/67 |
| 2017/0155353 A1 * | 6/2017 | Lee | H02P 29/66 |

* cited by examiner

*Primary Examiner* — Kawing Chan
*Assistant Examiner* — Bradley R Brown
(74) *Attorney, Agent, or Firm* — Quinn IP Law

(57) ABSTRACT

A method, system, and apparatus for controlling and regulating operation of a permanent magnet rotary electric machine including a stator and a rotor includes determining a first reactive power term associated with the electric machine based upon voltage, and determining a second reactive power term associated with the electric machine based upon flux. A first motor temperature associated with the electric machine is determined based upon the first and second reactive power terms, and power output from the permanent magnet electric machine is controlled based upon the first motor temperature.

18 Claims, 3 Drawing Sheets

US 11,264,936 B2

METHOD AND APPARATUS FOR CONTROLLING OPERATION OF A PERMANENT MAGNET ROTARY ELECTRIC MACHINE

INTRODUCTION

The present disclosure relates to methods and systems for real-time estimation of temperature of a permanent magnet rotary electric machine, and operational control based thereon.

Machine temperature is a useful control variable when regulating operation of an electric machine. Accurate knowledge of the machine temperature is also needed for accurate diagnostics. Existing methodologies for estimating machine temperature tend to depend on complex thermal models. Robustness of a thermal model may be dependent upon reliable information about an electric machine's cooling system, e.g., coolant temperature and flow rate, and may be susceptible to signal errors in the various required input signals. Likewise, temperature estimation approaches that rely on knowledge of machine resistance may tend to be subverted by core, eddy current, and other loss effects, all of which may be difficult to decouple from temperature effects.

SUMMARY

A method, system, and apparatus for controlling and regulating operation of a permanent magnet rotary electric machine including a stator and a rotor is described. This includes determining a first reactive power term associated with the electric machine based upon voltage, and determining a second reactive power term associated with the electric machine based upon flux. A first motor temperature associated with the electric machine is determined based upon the first and second reactive power terms, and power output from the permanent magnet electric machine is controlled based upon the first motor temperature.

An aspect of the disclosure includes determining the first reactive power term associated with the electric machine based upon voltage by determining a voltage, a current, a rotational speed, and a torque command associated with operation of the electric machine, determining a flux term based upon the torque command. A first stator voltage term is determined based upon the rotational speed, the current and the flux term, and a second stator voltage term is determined based upon the rotational speed, the current and the flux term. The first reactive power term is determined based upon the first and second stator voltage terms. One advantage of determining the first reactive power term based upon the first and second voltage terms is that there is no effect on the first reactive power term due to temperature-related variation in the stator resistance.

Another aspect of the disclosure includes determining the second reactive power term associated with the electric machine based upon flux by determining a current and a rotational speed, determining a temperature of the electric machine, determining a first flux term based upon the current and the temperature of the electric machine, determining a second flux term based upon the current and the temperature of the electric machine, and determining the second reactive power term based upon the rotational speed and the first and second flux terms.

Another aspect of the disclosure includes the temperature of the electric machine being an estimated temperature of a rotor magnet of the electric machine.

Another aspect of the disclosure includes determining the second reactive power term based upon the rotational speed and the first and second flux terms by determining the second reactive power term based upon the rotational speed and a difference between the first and second flux terms.

Another aspect of the disclosure includes determining the first motor temperature associated with the electric machine based upon the first and second reactive power terms by determining a temperature of a rotor magnet of the electric machine.

Another aspect of the disclosure includes determining, via a thermal model, a second motor temperature, comparing the first motor temperature and the second motor temperature, and controlling power output from the permanent magnet electric machine based upon the comparison of the first motor temperature and the second motor temperature.

Another aspect of the disclosure includes controlling the power output from the permanent magnet electric machine based upon the comparison of the first motor temperature and the second motor temperature by derating the power output from the permanent magnet electric machine when a difference between the first motor temperature and the second motor temperature is greater than a threshold.

Another aspect of the disclosure includes controlling the power output from the permanent magnet electric machine based upon the comparison of the first motor temperature and the second motor temperature by maximizing the power output from the permanent magnet electric machine when a difference between the first motor temperature and the second motor temperature is less than a threshold.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

As used herein, the term "system" may refer to mechanical and electrical hardware, software, firmware, electronic control componentry, processing logic, and/or processor device, individually or in combination, including without limitation: application specific integrated circuit (ASIC), an electronic circuit, a processor (shared, dedicated, or group) that executes one or more software or firmware programs, memory device(s) that electrically store software or firmware instructions, a combinatorial logic circuit, and/or other components that provide the described functionality.

Figure 1:
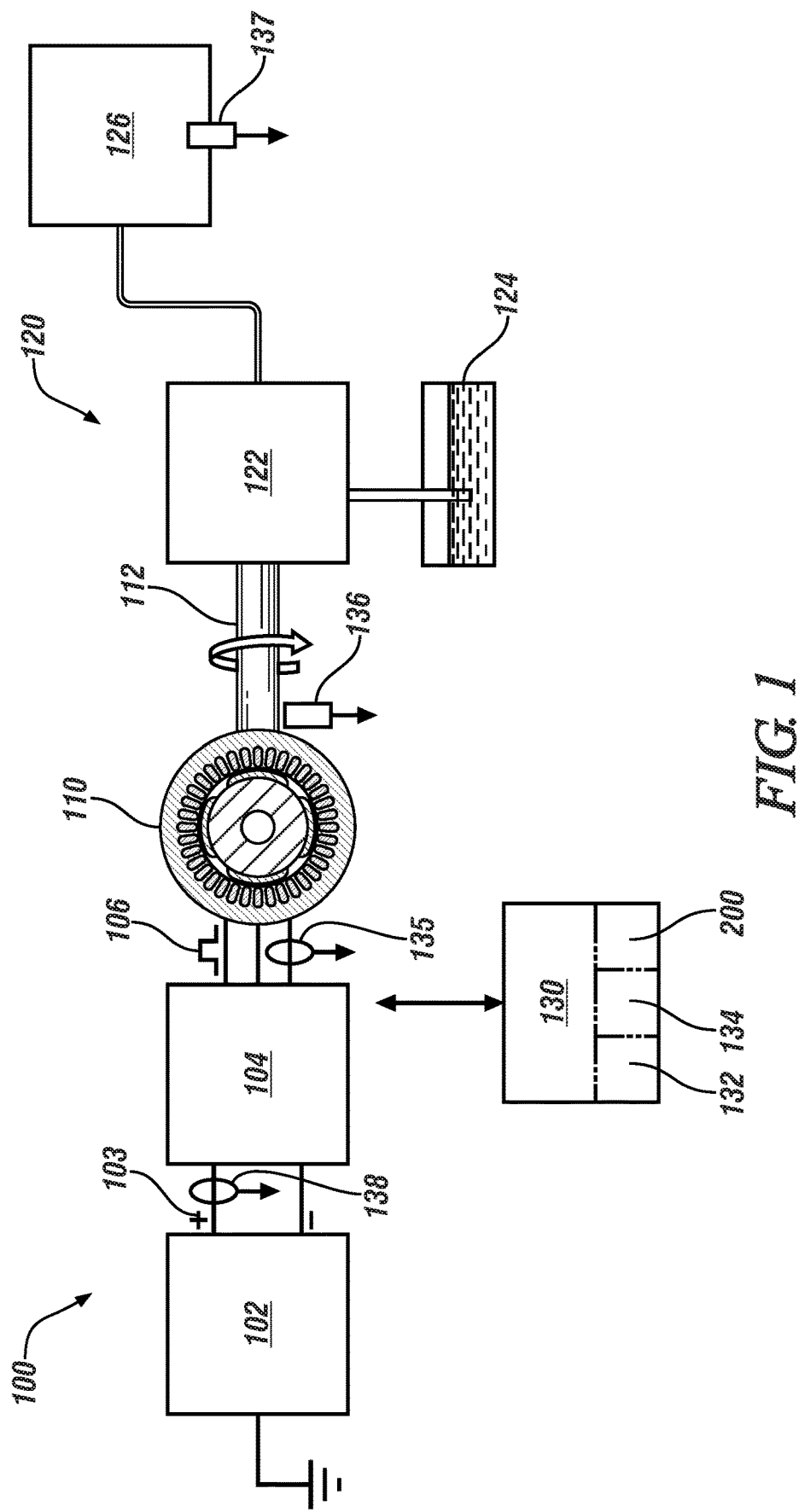
FIG. 1 is a schematic illustration of a system employing a permanent magnet rotary electric machine, in accordance with the present disclosure.

Referring to the drawings, wherein like reference numbers refer to the same or like components in the several Figures, FIG. 1 schematically illustrates a system 100 that includes a multi-phase electric machine ("electric machine") 110 that is arranged to generate and transfer torque to an actuator 120 to effect work, and a controller 130 that executes a control routine 200 to control and manage operation thereof. Details related to the control routine 200 are described with reference to FIGS. 3 and 4. In one embodiment, the system 100 is disposed on a vehicle (not shown). When disposed on a vehicle, the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The system 100 includes the electric machine 110, an inverter 104 and a DC power source 102. The DC power source 102 connects to the inverter 104 via a high-voltage DC bus 103, and the inverter 104 connects to the electric machine 110 via a plurality of electrical power lines 106. The inverter 104 includes a plurality of semiconductor switches (not shown) that are arranged and controllable to transform DC electric power to AC electric power, and transform AC electric power to DC electric power, employing pulse-width modulation or another control technique. The inverter 104 is arranged and controllable to transform DC electric power originating from the DC power source 102 to AC electric power to actuate the electric machine 110 to rotate and generate mechanical torque that is transferred via a rotatable member 112 to the actuator 120 when operating in a torque generating mode. The electric machine 110 is controllable to generate AC electric power from mechanical torque originating at the actuator 120, which is transformed by the inverter 104 to DC electric power for storage in the DC power source 102 when operating in an electric power generating mode. The actuator 120 includes, in one embodiment, a hydraulic system that includes a pump element 122 and associated sump 124 that supplies pressurized hydraulic fluid to a hydraulic actuator 126, wherein hydraulic actuator 126 may be controllable to effect a vehicle function when employed on-vehicle. The DC power source 102 may be in the form of a rechargeable electrochemical battery device, a fuel cell, an ultracapacitor, and/or another battery technology.

Sensors are arranged to monitor parameters of the system 100. Monitored parameters include, by way of non-limiting examples, voltage and current between the electric machine 110 and the inverter 104, and rotational speed of the electric machine 110. Other monitored parameters may include, e.g., hydraulic pressure transferred to the hydraulic actuator 126, voltage at the high-voltage DC bus 103, etc. In one embodiment, the sensors may include a voltage sensor 138 that is arranged to monitor the high-voltage DC bus 103, one or a plurality of current sensors 135 that is arranged to monitor current flow between the inverter 104 and the electric machine 110, a rotational speed sensor 136 that is arranged to monitor rotational speed of the rotatable member 112 of the electric machine 110, and a hydraulic pressure sensor 137 that is arranged to monitor pressure in the hydraulic actuator 126. Other monitored parameters may include motor commands, including a motor torque command, which may originate from an operator torque request or a system request associated with the actuator 120.

The controller 130 may be embodied as one or more digital computing devices, and may include one or more processors 134 and sufficient amounts of tangible non-transitory memory 132, including read only memory in the form of optical, magnetic, flash memory, etc. The control routine 200 may be stored as an executable instruction set in the memory 132 and executed by one of the processors 134 of the controller 130. The controller 130 is in communication with the inverter 104 and the aforementioned sensors to control operation thereof in response to execution of the control routine 200 to operate the electric machine 110.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit (s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit (s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term "model" refers to a processor-based or processor-executable code and associated calibration that simulates a physical existence of a device or a physical process. As used herein, the terms "dynamic" and "dynamically" describe steps or processes that are executed in real-time and are characterized by monitoring or otherwise determining states of parameters and regularly or periodically updating the states of the parameters during execution of a routine or between iterations of execution of the routine.

The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2A:
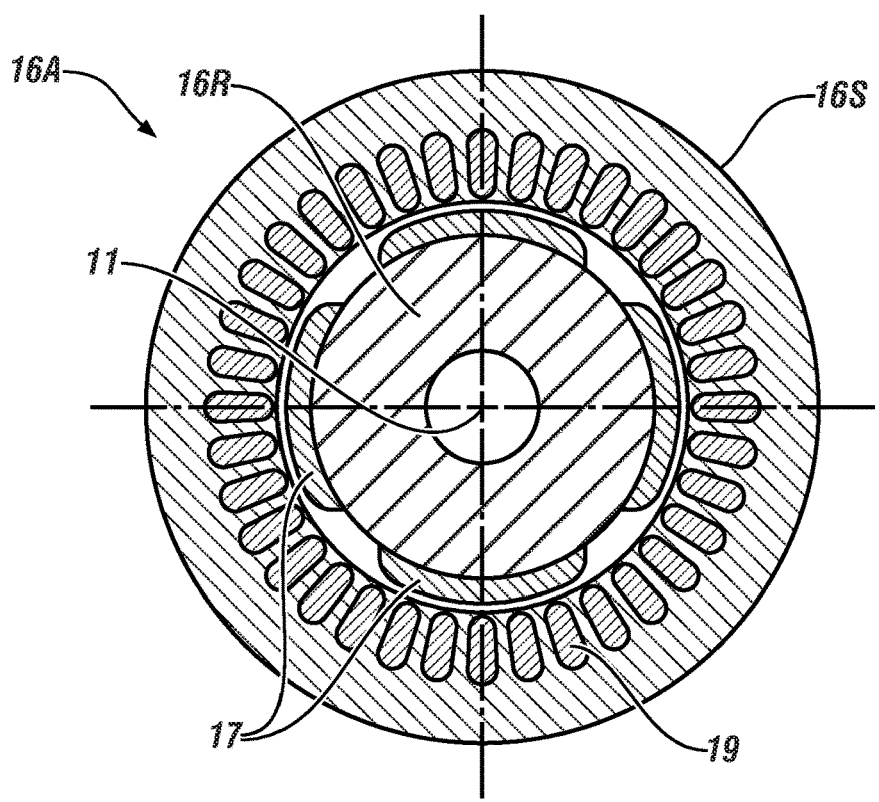
FIGS. 2A and 2B are depictions of alternative surface-mounted and embedded rotor magnet configurations of the electric machine shown schematically in FIG. 1, in accordance with the disclosure.
Figure 2B:
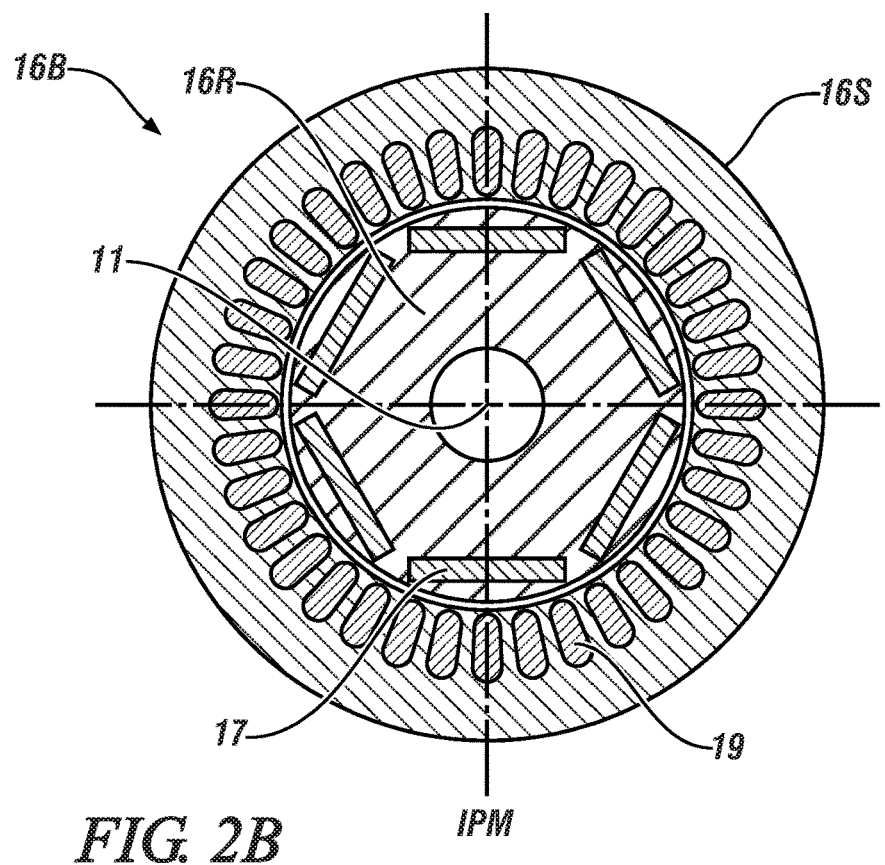

Referring now to FIGS. 2A and 2B, the electric machine 110 of FIG. 1 may be embodied as a surface permanent magnet ("SPM")-type synchronous device 16A (FIG. 2A), or an interior permanent magnet ("IPM")-type synchronous device 16B (FIG. 2B). In the SPM-type synchronous device 16A, permanent magnets 17 are mounted to a surface of a rotor 16R. In the IPM-type synchronous device 16B, the permanent magnets 17 may be embedded within laminations of the rotor 16R. Each of the SPM-type synchronous device 16A and the IPM-type synchronous device 16B includes a stator 16S that is concentric to and surrounds the rotor 16R. The stator 16S includes a plurality of inwardly-oriented radially-projecting stator teeth, with interposed gaps. Stator windings in the form of lengths of conductive wire are inserted into the gaps between adjacent stator teeth, and connected to the inverter 104 to generate a rotating magnetic field. The stator 16S surrounds the rotor 16R in the illustrated configurations. However, in other embodiments the rotor 16R may surround the stator 16S. Individual stator windings 19 are also shown. When the individual stator windings 19 are energized via operation of the inverter 104 shown in FIG. 1, a rotating stator magnetic field ensues, with the rotating stator field interacting with the magnetic field of the permanent magnets 17. The rotating magnetic field interacts with the permanent magnets 17 of the rotor 16R to urge rotation of the rotor 16R on its axis, thus inducing torque on the rotor shaft. Mutual field interaction ultimately imparts rotation to the rotor 16R about its center axis 11, with such rotation generating the motor output torque. FIGS. 2A and 2B illustrate two possible configurations of the electric machine 110 and permanent magnets 17. However, the present teachings are not limited to a particular configuration of the electric machine 110, and therefore FIGS. 2A and 2B merely illustrate two common locations of the permanent magnets 17 in the rotor 16R.

Figure 3:
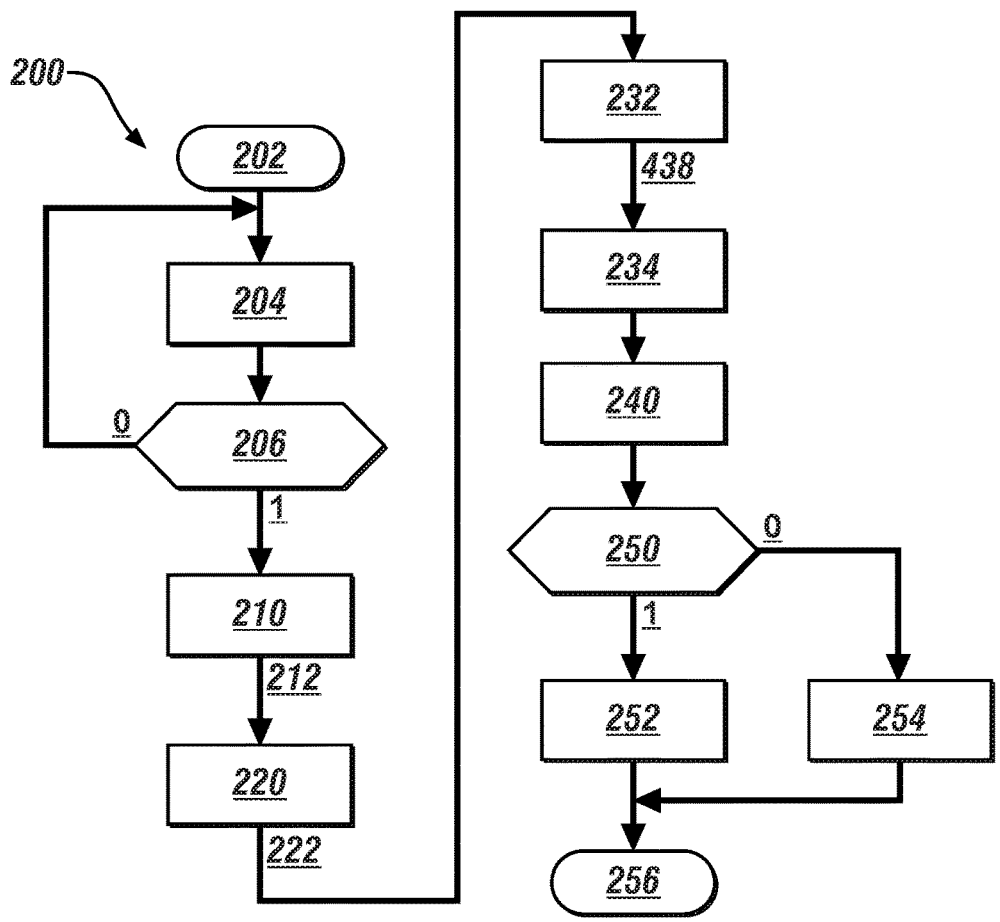
FIG. 3 is a logic flow diagram depicting a logic configuration of the controller shown in FIG. 2 in accordance with the disclosure.

FIG. 3 schematically shows an embodiment of the control routine 200, which may be implemented as executable code to control operation on a permanent magnet rotary electric machine, e.g., an embodiment of the electric machine 110 that is described with reference to FIG. 1. The control routine 200 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. Table 1 is provided as a key wherein the numerically labeled blocks and the corresponding functions are set forth as follows, corresponding to the control routine 200.

TABLE 1

| BLOCK | BLOCK CONTENTS |
|---|---|
| 202 | Initiate routine |
| 204 | Monitor parameters including motor speed and torque command |
| 206 | Is motor speed > threshold speed? AND Is torque command > threshold torque? |
| 210 | Determine first reactive power parameter based upon voltage |
| 220 | Determine second reactive power parameter based upon flux |
| 230 | Estimate magnet temperature |
| 232 | Update flux based upon estimated magnet temperature |
| 234 | Estimate rotor temperature from thermal model |
| 250 | Compare magnet temperature and rotor temperature |
| 252 | Operate electric machine in response to torque request when difference between the magnet temperature and rotor temperature is less than threshold |
| 254 | Derate torque output of electric machine when difference between the magnet temperature and the rotor temperature is greater than threshold |
| 256 | End iteration |

Execution of the control routine 200 may proceed as follows. The steps of the control routine 200 may be executed in a suitable order, and are not limited to the order described with reference to FIG. 3. As employed herein, the term "1" indicates an answer in the affirmative, or "YES", and the term "0" indicates an answer in the negative, or "NO".

The control routine 200 may periodically execute, with each iteration starting (202) by determining parameters including the rotational speed and the torque command for the electric machine 110 (204). The rotational speed and the torque command serve as entrance criteria for executing the remaining elements of the control routine 200 by avoiding execution thereof under conditions that include low speed and/or low power operation. When the rotational speed is greater than a minimum threshold speed and the torque command is greater than a minimum threshold torque, operation of the control routine 200 continues (206)(1). Otherwise (206)(0), monitoring of the rotational speed and the torque command continues without further action.

When execution continues, a first reactive power term $Q_{volt}$ is determined based upon the motor voltage (210), in accordance with the following set of equations.

$$v_{ds}^e = R_s i_{ds}^e - \omega_r \lambda_{qs}^e \quad [1]$$

$$v_{qs}^e = R_s i_{qs}^e + \omega_r \lambda_{ds}^e \quad [2]$$

$$Q_{volt} = v_{qs}^e i_{ds}^e - v_{ds}^e i_{qs}^e \quad [3]$$

wherein:
$R_s$ represents stator resistance;
$\omega_r$ represents rotational speed;
$\lambda$ represents a respective flux term;
i represents a respective current term;
s indicates stator;
d, q are associated with machine parameters described in a synchronous reference frame that indicate direct and quadrature axes, respectively; and
e indicates that the respective value is an estimate.

As is appreciated, the first reactive power term $Q_{volt}$ can be determined without a need for determining the stator resistance $R_s$ employing the relationship described in Eq. 3. The stator resistance $R_s$ varies with temperature and rotational speed, and would otherwise introduce variability that would need to be accounted for. By determining the first reactive power term $Q_{volt}$ in this manner, robustness is introduced into the outcome.

A second reactive power term $Q_{flux}$ is determined based upon the motor flux (220), either in parallel or in series with execution of Step 210. The second reactive power term $Q_{flux}$, which is a flux parameter that is temperature-dependent and is determined in accordance with the following set of equations.

$$Q_{flux} = \omega_r(\lambda_{ds\_T}^e i_{qs}^e - \lambda_{qs\_T}^e i_{ds}^e) \quad [4]$$

$$= \omega_r(\lambda_{ds@90C.}^e i_{qs}^e - \lambda_{qs@90C.}^e i_{ds}^e + \Delta\lambda_{fT} i_{qs}^e)$$

wherein:
$\lambda_{ds\_T}^e = f(i_{ds}^e, i_{qs}^e, T_{Magnet\_est})$
$\lambda_{qs\_T}^e = g(i_{ds}^e, i_{qs}^e, T_{Magnet\_est})$
wherein $f(i_{ds}^e, i_{qs}^e, T_{Magnet\_est})$ and $g(i_{ds}^e, i_{qs}^e, T_{Magnet\_est})$ represent functions that are employed to determine the respective flux value in relation to estimated direct and quadrature axis stator currents and an estimated magnet temperature; and
wherein:
$T_{magnet\_est}$ represents the estimated magnet temperature,
$\omega_r$ represents rotational speed of the rotor,
$\lambda_{ds@90C}^e$ represents an estimated d-axis flux for the electric machine with the stator operating at 90° C.,
$\lambda_{qs@90C}^e$ represents an estimated q-axis flux for the electric machine with the stator operating at 90° C.,
i represents a respective current term,
s indicates stator,
d, q are associated with synchronous machine parameters, and indicate direct and quadrature axes, respectively, and
e indicates that the respective value is an estimate.

The estimated magnet temperature $T_{magnet\_est}$ 438 can be determined in relation to the difference between the first reactive power term $Q_{volt}$ and the second reactive power term $Q_{flux}$ (232). Details related to determining the estimated magnet temperature $T_{magnet\_est}$ 438 are described with reference to FIG. 4.

The magnetic flux linkage term is updated based upon the estimated magnet temperature $T_{magnet\_est}$ (234), with the update to the magnetic flux linkage term being based on the relation between flux density in a permanent magnet rotary electric machine and temperature, wherein flux density decreases with an increase in temperature of the permanent magnet.

An estimated rotor temperature can be determined from a thermal model (240). Examples of thermal models for estimating rotor temperature include, e.g., lumped mass thermal models for temperature prediction.

The estimated magnet temperature $T_{magnet\_est}$ and the estimated rotor temperature are compared (250), and when a difference therebetween is less than a temperature threshold (250)(1), operation of the electric machine 110 is controlled without limitation in response to a torque command up to a maximum torque output that is achievable by the electric machine 110 (252).

However, when a difference between the estimated magnet temperature $T_{magnet\_est}$ and the estimated rotor temperature is greater than a temperature threshold (250)(0), operation of the electric machine 110 is derated (254). In one embodiment, derating includes limiting the magnitude of torque output from the electric machine 110, with the limitation in the magnitude of the derating being a direct relation to the difference between the estimated magnet temperature $T_{magnet\_est}$ and the estimated rotor temperature. The iteration of the control routine 200 ends thereafter (256).

Figure 4:
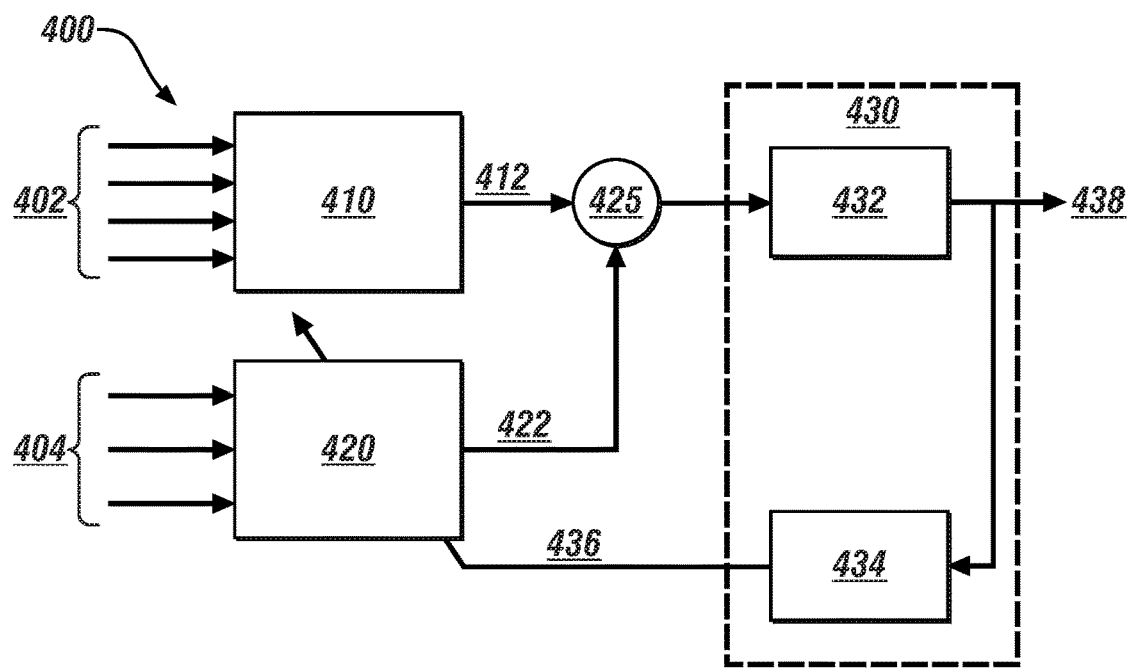
FIG. 4 is a logic flow diagram depicting a portion of the logic configuration that is described with reference to FIG. 3, in accordance with the disclosure.

FIG. 4 schematically shows a logic diagram 400 providing additional detail related to aspects of the control routine 200 that is described with reference to FIG. 3, including determining the estimated magnet temperature $T_{magnet\_est}$ 438. The logic diagram is in the form of a closed-loop system that provides temperature-based compensation of flux. Step 410 provides details to determine the first reactive power parameter $Q_{volt}$ 412 based upon direct and quadrature voltage and current inputs 402 in accordance with Eq. 3, above. Step 420 provides details to determine the second reactive power parameter $Q_{flux}$ 422 based upon direct and quadrature current inputs and rotational speed 402 and in accordance with Eq. 4, above.

A difference operator 425 calculates a difference between the first reactive power term $Q_{volt}$ and the second reactive power parameter $Q_{flux}$, the result of which is employed in the magnet temperature estimator 430 to estimate the magnet temperature $T_{magnet\_est}$ 438.

The magnet temperature estimator 430 includes a scalar multiplier 432, which determines the estimated magnet temperature $T_{magnet\_est}$ 438 based upon the difference between the first reactive power term $Q_{volt}$ and the second reactive power parameter $Q_{flux}$. The scalar multiplier 432 may be in the form of a proportional term, a proportional-integral (PI) term, or a proportional-integral-derivative (PID) term.

The magnet temperature estimator 430 includes a magnetic flux linkage table 434, which determines a flux correction term $\Delta\lambda_{f\_T}$ 436 in relation to the estimated magnet temperature $T_{magnet\_est}$ 438. The flux correction term $\Delta\lambda_{f\_T}$ 436 is provided as a feedback term to step 420 to determine the second reactive power parameter $Q_{flux}$ 422 based upon direct and quadrature current inputs and rotational speed 402.

By employing the closed-loop arrangement in the manner shown with reference to FIG. 4 to determine the estimated magnet temperature $T_{magnet\_est}$, with two reactive power calculations and the compensator, the control routine 200 is robust to inverter losses and variations in motor series resistance that is a function of rotor speed and temperature. As such, the system 100 described with reference to FIG. 1 employs an electrical-based temperature estimation method and associated system that provides a robust value without information on thermal capacities of the various elements of the electric machine, and without needing to compensate for speed-based variation in resistance of the motor to estimate temperature. When the system 100 is employed on-vehicle, it is able to monitor and detect faults in an electric machine cooling system to effect reduced propulsion by (a) estimating magnet temperature based on independent two reactive power calculations with voltage equations in the synchronous reference frame and reactive power calculation with flux tables, by (b) designing the magnet estimator, and by (c) comparing estimated magnet temperature and rotor temperature from thermal model.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method for controlling a permanent magnet rotary electric machine including a stator and a rotor, wherein the rotor includes a plurality of permanent magnets, the method comprising:
    determining a first reactive power term associated with the electric machine based upon voltage;
    determining a second reactive power term associated with the electric machine based upon flux, wherein the flux is determined based upon a temperature of the permanent magnets;
    determining a first motor temperature associated with the electric machine based upon the first and second reactive power terms; and
    controlling power output from the permanent magnet electric machine based upon the first motor temperature.

2. The method of claim 1, wherein determining the first reactive power term associated with the electric machine based upon voltage comprises:
    determining a voltage, a current, a rotational speed, and a torque command associated with operation of the electric machine;
    determining a flux term based upon the torque command;
    determining a first stator voltage term based upon the rotational speed, the current and the flux term;
    determining a second stator voltage term based upon the rotational speed, the current and the flux term; and
    determining the first reactive power term based upon the first and second stator voltage terms.

3. The method of claim 1, wherein determining the second reactive power term associated with the electric machine based upon flux comprises:
    determining a current and a rotational speed;
    determining the temperature of the permanent magnets of the electric machine;
    determining a first flux term based upon the current and the temperature of the electric machine;
    determining a second flux term based upon the current and the temperature of the permanent magnets of the electric machine; and
    determining the second reactive power term based upon the rotational speed and the first and second flux terms.

4. The method of claim 3, wherein determining the second reactive power term based upon the rotational speed and the first and second flux terms comprises determining the second reactive power term based upon the rotational speed and a difference between the first and second flux terms.

5. The method of claim 3, wherein the temperature of the permanent magnets of the electric machine comprises an estimated temperature of the permanent magnets.

6. The method of claim 1, wherein determining the first motor temperature associated with the electric machine based upon the first and second reactive power terms comprises determining a temperature of a rotor magnet of the electric machine.

7. The method of claim 1, further comprising:
    determining, via a thermal model, a second motor temperature;
    comparing the first motor temperature and the second motor temperature; and
    controlling power output from the permanent magnet electric machine based upon the comparing of the first motor temperature and the second motor temperature.

8. The method of claim 7, wherein controlling the power output from the permanent magnet electric machine based upon the comparing of the first motor temperature and the second motor temperature comprises derating the power output from the permanent magnet electric machine when a difference between the first motor temperature and the second motor temperature is greater than a threshold.

9. The method of claim 7, wherein controlling the power output from the permanent magnet electric machine based upon the comparing of the first motor temperature and the second motor temperature comprises maximizing the power output from the permanent magnet electric machine when a difference between the first motor temperature and the second motor temperature is less than a threshold.

10. A system, including:
    a permanent magnet rotary electric machine including a stator and a rotor, wherein the rotor includes a plurality of permanent magnets;
    an inverter;
    a controller, operatively coupled to the inverter and in communication with current, voltage and speed sensors that are disposed to monitor the rotary electric machine, the controller including an instruction set, the instruction set executable to:
        determine a first reactive power term associated with the electric machine based upon voltage;
        determine a second reactive power term associated with the electric machine based upon flux, wherein the flux is determined based upon a temperature of the permanent magnets;
        determine a first motor temperature associated with the electric machine based upon the first and second reactive power terms; and
        control, via the inverter, power output from the permanent magnet electric machine based upon the first motor temperature.

11. The system of claim 10, wherein the instruction set executable to determine the first reactive power term associated with the electric machine based upon voltage comprises the instruction set executable to:
- determine a voltage, a current, a rotational speed, and a torque command associated with operation of the electric machine;
- determine a flux term based upon the torque command;
- determine a first stator voltage term based upon the rotational speed, the current and the flux term;
- determine a second stator voltage term based upon the rotational speed, the current and the flux term; and
- determine the first reactive power term based upon the first and second stator voltage terms.

12. The system of claim 10, wherein the instruction set executable to determine the second reactive power term associated with the electric machine based upon flux comprises the instruction set executable to:
- determine a current and a rotational speed;
- determine the temperature of the permanent magnets of the electric machine;
- determine a first flux term based upon the current and the temperature of the electric machine;
- determine a second flux term based upon the current and the temperature of the permanent magnets of the electric machine; and
- determine the second reactive power term based upon the rotational speed and the first and second flux terms.

13. The system of claim 12, wherein the instruction set executable to determine the second reactive power term based upon the rotational speed and the first and second flux terms comprises the instruction set executable to determine the second reactive power term based upon the rotational speed and a difference between the first and second flux terms.

14. The system of claim 12, wherein the temperature of the permanent magnets of the electric machine comprises an estimated temperature of the permanent magnets.

15. The system of claim 10, wherein the instruction set executable to determine the first motor temperature associated with the electric machine based upon the first and second reactive power terms comprises the instruction set executable to determine a temperature of a rotor magnet of the electric machine.

16. The system of claim 10, wherein the instruction set is further executable to:
- determine, via a thermal model, a second motor temperature;
- compare the first motor temperature and the second motor temperature; and
- control power output from the permanent magnet electric machine based upon the comparing of the first motor temperature and the second motor temperature.

17. The system of claim 16, wherein the instruction set executable to control the power output from the permanent magnet electric machine based upon the comparing of the first motor temperature and the second motor temperature comprises the instruction set executable to derate the power output from the permanent magnet electric machine when a difference between the first motor temperature and the second motor temperature is greater than a threshold.

18. The system of claim 16, wherein the instruction set executable to control the power output from the permanent magnet electric machine based upon the comparing of the first motor temperature and the second motor temperature comprises the instruction set executable to maximize the power output from the permanent magnet electric machine when a difference between the first motor temperature and the second motor temperature is less than a threshold.

* * * * *